US009258784B2

(12) United States Patent
Sinton et al.

(10) Patent No.: US 9,258,784 B2
(45) Date of Patent: Feb. 9, 2016

(54) METHOD AND DEVICE FOR OPTIMIZING MOBILE RADIO TRANSMITTER/RECEIVER HAVING ANTENNA

(75) Inventors: Lee Corey Sinton, Berkshire (GB); Neil Briffett, Surrey (GB)

(73) Assignee: Nokia Technologies Oy, Espoo (FI)

( * ) Notice: Subject to any disclaimer, the term of this patent is extended or adjusted under 35 U.S.C. 154(b) by 867 days.

(21) Appl. No.: 12/667,003

(22) PCT Filed: Jun. 28, 2007

(86) PCT No.: PCT/IB2007/001778
§ 371 (c)(1),
(2), (4) Date: Apr. 28, 2010

(87) PCT Pub. No.: WO2009/001154
PCT Pub. Date: Dec. 31, 2008

(65) Prior Publication Data
US 2011/0045789 A1    Feb. 24, 2011

(51) Int. Cl.
*H01Q 11/12* (2006.01)
*H04B 1/04* (2006.01)
*H04W 52/10* (2009.01)
*H04W 52/24* (2009.01)

(52) U.S. Cl.
CPC .......... *H04W 52/10* (2013.01); *H04W 52/246* (2013.01)

(58) Field of Classification Search
CPC ... H04W 4/021; H04W 48/04; H04W 52/283; H04W 52/30; H04W 52/322; H04W 52/367
USPC ............... 455/91, 127.1–127.5, 129, 522, 455/120–125
See application file for complete search history.

(56) References Cited

U.S. PATENT DOCUMENTS

| 5,995,813 | A  | * | 11/1999 | Ishikura et al. ............ 455/127.2 |
| 6,018,650 | A  |   | 1/2000  | Petsko |
| 6,188,678 | B1 | * | 2/2001  | Prescott ........................ 370/318 |
| 6,295,443 | B1 | * | 9/2001  | Matthew et al. ........... 455/115.1 |

(Continued)

FOREIGN PATENT DOCUMENTS

| CN | 1355964 A | 6/2002 |
| CN | 1585281 A | 2/2005 |

(Continued)

OTHER PUBLICATIONS

International Search Report and Written Opinion mailed May 3, 2008, for corresponding PCT Application No. PCT/IB2007/001778 filed Jun. 28, 2007, 20 pages.

(Continued)

*Primary Examiner* — Simon Nguyen
(74) *Attorney, Agent, or Firm* — Locke Lord LLP

(57) ABSTRACT

A method is provided, comprising transmitting a radio transmission using a radio transmitter circuit connected to a corresponding antenna of a mobile electronic device, detecting a change in transmission conditions, and adjusting the power radiated by said antenna in response to a detected change. A mobile electronic device is provided, comprising a radio transmitter circuit, an antenna connected to said radio transmitter circuit, and a controller adapted for transmitting a radio transmission using said radio transmitter circuit, detecting a change in transmission conditions, and adjusting the power radiated by said antenna in response to a detected change.

20 Claims, 5 Drawing Sheets

(56) References Cited

U.S. PATENT DOCUMENTS

| | | | |
|---|---|---|---|
| 6,334,047 B1* | 12/2001 | Andersson et al. | 455/69 |
| 7,245,880 B1* | 7/2007 | Jacobsen | 455/69 |
| 7,623,086 B2* | 11/2009 | Lafleur | 343/841 |
| 7,668,562 B1* | 2/2010 | Longaker et al. | 455/522 |
| 7,747,271 B2* | 6/2010 | Walton et al. | 455/522 |
| 8,000,737 B2* | 8/2011 | Caimi et al. | 455/550.1 |
| 8,044,716 B1* | 10/2011 | Loeb et al. | 330/51 |
| 8,131,251 B2* | 3/2012 | Burgener et al. | 455/333 |
| 2004/0108895 A1* | 6/2004 | Wu et al. | 330/66 |
| 2004/0110477 A1* | 6/2004 | Nishimura et al. | 455/127.1 |
| 2004/0180686 A1* | 9/2004 | Nakayama | 455/522 |
| 2004/0192408 A1* | 9/2004 | Sharp et al. | 455/572 |
| 2004/0242257 A1* | 12/2004 | Valkealahti et al. | 455/522 |
| 2005/0026573 A1* | 2/2005 | Cho | 455/114.2 |
| 2005/0153671 A1* | 7/2005 | Ichikawa | 455/127.2 |
| 2005/0227658 A1* | 10/2005 | Saliga et al. | 455/272 |
| 2006/0014503 A1* | 1/2006 | Theobold et al. | 455/126 |
| 2006/0046775 A1* | 3/2006 | Geiger | 455/556.1 |
| 2006/0094458 A1* | 5/2006 | Kitaji | 455/522 |
| 2007/0123207 A1* | 5/2007 | Terlizzi | 455/403 |
| 2007/0238423 A1* | 10/2007 | Kasha et al. | 455/121 |
| 2008/0003962 A1 | 1/2008 | Ngai | |
| 2008/0009243 A1* | 1/2008 | Hart | 455/67.13 |
| 2008/0081572 A1* | 4/2008 | Rofougaran | 455/127.1 |
| 2009/0068966 A1* | 3/2009 | Drogi et al. | 455/127.1 |
| 2009/0191907 A1* | 7/2009 | McCallister et al. | 455/501 |
| 2009/0289719 A1* | 11/2009 | Van Bezooijen et al. | 330/285 |
| 2010/0220243 A1* | 9/2010 | Chien et al. | 348/733 |
| 2012/0164963 A1* | 6/2012 | Rofougaran | 455/127.2 |
| 2012/0238331 A1* | 9/2012 | Dou et al. | 455/574 |
| 2013/0230003 A1* | 9/2013 | Vijayan et al. | 370/329 |
| 2013/0230027 A1* | 9/2013 | Das et al. | 370/336 |

FOREIGN PATENT DOCUMENTS

| | | |
|---|---|---|
| EP | 1122892 A2 | 8/2002 |
| EP | 1503504 A3 | 7/2004 |
| EP | 1524774 A1 | 4/2005 |
| WO | WO0062441 A1 | 4/2000 |
| WO | 2006080304 A1 | 8/2006 |

OTHER PUBLICATIONS

Notification of 2nd Office Action from The State Intellectual Property Office of the People's Republic of China, 4 pages, dated Jan. 21, 2013.

Translation of Chinese Patent Office for CN Patent Application No. 200780053554.6.dated Aug. 28, 2014.

EP Communication dated Oct. 9, 2015 for European Patent Application No. 07804543.2-1855, 5 pages.

* cited by examiner

ND AND DEVICE FOR OPTIMIZING
METHOD AND DEVICE FOR OPTIMIZING MOBILE RADIO TRANSMITTER/RECEIVER HAVING ANTENNA

RELATED APPLICATION

This application was originally filed as PCT Application No. PCT/IB2007/001778 filed Jun. 28, 2007.

The present invention relates to the optimization of the radio transmission/reception of mobile radio transmitters and/or receivers. It particularly relates to an optimization of the matching between a radio circuit and its associated antenna and of the effective radiated power of low power radio devices.

Low power Frequency Modulation Transmitter (FMTx) devices are becoming more widely available and common, e.g. for transmitting audio from a mobile mp3 player to an in-car FM radio receiver. The majority of devices available today are dedicated FMTx devices, e.g. to be plugged into the headphone socket, but FM transmitters are more and more also being integrated with devices such as Personal Digital Assistants (PDAs) and mobile phones.

Most of these devices have extremely short FM antennas compared to the theoretical ideal length. Most dedicated FMTx devices use a simple wire or a Printed Circuit Board (PCB) trace, which can be of a length that is usually sufficient. However, PDAs and mobile phones have far less space in them that can be utilized for the placement of a suitable antenna and since the general trend for these devices is to make them smaller, the integration is not going to get any easier. Generally, these devices will be forced to use extremely short and therefore poor FM antennas. They could typically be as short as 3-6 cm or even less. At 98 MHz a full wave antenna has a length of around 3 meters. A quarter wave antenna for 98 MHz is therefore around 75 cm, which is still considerably longer than typically available in a PDA or mobile phone.

Different antenna structures may be beneficial for certain devices depending on shape and form but irrespective of the antenna structure used (monopole, dipole, loop etc.), the available space and the surrounding, e.g. remaining hardware and the chassis of the device, will have an effect on the antenna and its performance.

The problem is that by the very nature of these usually mobile FMTx devices, a user at some point will hold the device in his hand in order to activate it and set it up. The user may then put the device on a seat of a car or pass the device around to his friends or maybe he will inadvertently place the device on or next to something comprising metal. All of these aspects will have an influence on the antenna's performance, and normally this will result in the antenna becoming unmatched. This in turn would result in reduced output power from the FMTx device and the user may experience interference or at worst even a total loss of signal. It must be remembered that these devices can only operate at extremely low power levels due to region-specific regulations (11.4 nW Equivalent Isotropically Radiated Power EIRP for the USA's Federal Communications Commission FCC and 50 nW Effective Radiated Power ERP for European Telecommunications Standards Institute ETSI). Therefore it is critical that the antenna remains as optimal as is possible.

This is also relevant for FM receivers. Small FM receiver devices are already finding their way in products such as PDAs, mobile phones and small dedicated devices. These devices have a similar problem with their antennas as do the low power FM transmitters. The antennas generally have to be shorter than what would be ideal. The best case is when a headset is used as an FM Rx cable which is around the 75 cm length (i.e. quarter wave length at 98 MHz). Internal FM Rx antennas are now becoming more popular and this will mean that the antenna performance will again become very critical if manufacturers want to maintain the same level of performance as is already achievable by the use of a headset or similar external Rx antenna.

In some respects Rx antennas have to perform better than Tx antennas since the receiver is at the mercy of the signal it is trying to receive and the sensitivity of the receiver itself. How good the Rx antenna performs will depend on how well it is matched to the front-end of the FM receiver. For the Tx case the antenna can be rather inefficient but may still appear to perform adequately by operating it with increased power provided to it. As there is no means to influence the transmitter from the receiver there is no such luxury with Rx. However, an Rx antenna suffers from just the same effects as described above for Tx antennas, i.e. dematching/mismatching of the antenna occurring due to changes in the surroundings. Therefore the avoidance of mismatching may even be more important in Rx devices.

As indicated above, the position of the FM transmitter in relation to the human body, metal structures or other material may influence the matching of the antenna. Especially, accessories that can be attached to the mobile device may contain such metal structures and therefore influence the matching of the antenna and the radiated power.

Unlike traditional dedicated low power FM transmitters, PDAs and mobile phones are capable of having many more varying types of accessories attached to them which result in much more varied possible use cases. Most accessories and/or other attachments, like data and/or charger cables etc., can be detected when they are connected to the device provided that they are connected at the other end e.g. to a personal computer (PC) or mains outlet. This might include a Universal Serial Bus (USB) cable for data transfer and/or battery charging, an in-car or mains battery charger or some other device. Most headsets and similar accessories can be identified by the handset automatically since the majority of these devices have some level of intelligence such that the PDA or mobile phone can read out a device ID and accordingly make a decision of how the device is treated.

Adding any kind of accessory or placing the device near a metal object or cable can in some cases improve the ERP of an FM transmitter. The effect of connecting a headset, charger, USB cable or like can have the net result of increasing the antenna ground plane which in turn can boost the ERP by as much as 30 dB. Therefore it is possible that this "amplification" increases to a point where the radiated power will exceed the level intended for the device. The intended/allowed radiation power is limited to a level defined by FCC, ETSI or any other regional legislation. This means that it is very easy for the low power FMTx device to violate the given FCC or ETSI maximum transmit power levels of 11.4 nW EIRP or 50 nW ERP, respectively, by this unintended "amplification".

Because the allowed power level limits are so comparatively low, the transmitter has to be set as close to these limits as possible in order to achieve acceptable performance. Therefore, any influence on the antenna which increases the ERP will easily be enough to exceed the limits and hence violate the legislation. Due to the small size of the antennas that are likely to be used in these types of devices (partly because of the fact that they may be internal FM antennas), the antenna performance as a whole will be very poor. Connecting accessories or placing the device near a metal object will effectively improve the antenna and hence increase the ERP.

If an FCC or ETSI test house detects that by adding an accessory the ERP exceeds the allowed maximum power level then the device will fail type approval. If the setting is left for the user to select, i.e. if the user is given the opportunity to select a lower power level when an accessory is connected, it is likely that he will either forget to change the setting or will intentionally not change the setting since he may experience an overall better FMTx performance while the device is transmitting more power than it legally should.

If it is discovered by users of these devices that one can improve the transmission performance by adding a particular accessory or by placing the device near a length of wire which results in an increased transmit power then this fact is likely to spread fast amongst users of these devices within Internet forums or like. A consequence of this may be that manufacturers of these devices will be forced to recall the product and either update the device or remove the device from sale completely. Either of these two options will be extremely costly and damaging to a manufacturer.

Current low power FM transmitters do not have any transmission power control mechanism so the act of powering the device from e.g. an in-car direct current (DC) socket is likely to increase the ERP of the transmitter and break any FCC or ETSI legislation for maximum transmit power allowed. The best that current devices can offer is to automatically select (e.g. by GPS or cellular information) or allow the user to select the region that the device will be operated in, e.g. Europe, Japan or the USA. The act of selecting one of these regions sets the Tx power level to an appropriate value for that region, e.g. FCC, ETSI or some other legislation.

Therefore there are two effects that can occur when using small antennas in mobile FMTx devices when an accessory device is connected to the device or when the device is placed in a location substantially affecting the antenna properties. A mismatch (or generally a change in the matching) of the antenna can be caused, and the radiated power can be affected. Both effects can deteriorate as well as improve the transmission performance by influencing the radiated power.

A connection of an accessory to a mobile device or placing the device near an object can cause an improved as well as degraded transmission performance. For an initially not optimal matching of an antenna a change in matching may cause an improvement of transmission, while an antenna matched optimally can get mismatched, resulting in degraded transmission performance. Improved performance can be prone to violations of regulations for low power FMTx devices.

Current solutions for Tx (as well as Rx) radio devices are inflexible and incapable of reacting to varying conditions with respect to changes in the surroundings and/or connection of peripheral or accessory devices while at the same time maintaining optimal transmission performance and remaining within the limits given by legislative regulations.

SUMMARY OF THE INVENTION

According to a first aspect of the invention a method is provided, comprising
    transmitting a radio transmission using a radio transmitter circuit connected to a corresponding antenna of a mobile electronic device;
    detecting a change in transmission conditions; and
    adjusting the power radiated by said antenna in response to a detected change.

The invention makes it possible to allow the device (e.g. mobile phone, PDA, media player device or dedicated FMTx device) to adjust the radiated power in order to maintain optimal transmission efficiency while the transmitter is being used. As low power FM transmission devices are only allowed to use a very limited radiated power, it is essential that the antenna and the corresponding radio circuit, e.g. an output stage, are operated as near to the optimum allowed value as possible.

Therefore the invention provides a better user experience with respect to transmission performance. The invention makes FM transmission devices safer for use in a vehicle, since the user will not be required or at least tempted to keep moving the handset in order to find the position providing its optimal link to the FM radio receiver. It allows PDA and mobile phone designers to worry less about the design of the antenna and where it is positioned, and the resulting devices are much less influenced by changes in surroundings, e.g. connected accessories.

According to an exemplary embodiment detecting a change in transmission conditions comprises
    measuring the voltage swing at said antenna.

According to an exemplary embodiment the method said adjusting comprises
    adjusting the matching between said antenna and said radio transmitter circuit.

To ensure optimum transmission performance, particularly in low power devices having only limited capabilities, it is important that antenna and radio circuit are matched electronically as good as possible.

According to an exemplary embodiment said adjusting is repeated in pre-determined, random or pseudo-random intervals.

According to an exemplary embodiment said radio transmission carries audio data, further comprising
    detecting passages in said audio data that have a local volume minimum;
wherein said adjusting is performed when a corresponding passage is detected.

The adjusting, e.g. rematching, operation may cause a noticeable, albeit very short, interruption or distortion of the audio transmission in an FM audio transmitter device. This embodiment allows placing (at least some of the adjusting/rematching operations) at passages in the audio transmission where the interruption will be less likely noticed.

According to an exemplary embodiment detecting a change in transmission conditions comprises
    detecting if an accessory device is connected to said mobile electronic device.

Low power radio transmission devices, e.g. FMTx audio transmitter devices for linking media player devices and FM car stereos, are usually legally restricted with respect to the allowed maximal transmission power. For example the regulations in the USA (FCC) or in Europe and Japan (ETSI) prescribe a maximum of 11.4 nW EIRP and 50 nW ERP, respectively. However, as these figures are rather low, it is essential to exploit the maximum allowed power as closely as possible, in order to provide a stable connection to the associated FM receiver.

For accessory devices that do not have any level of intelligence or that can't be detected when they are not connected at the other end (i.e. mains socket or PC etc.) a method is required to ensure that by connecting any type of accessory or peripheral the transmitted power from the low power transmitter does not exceed that of the currently valid legislation (e.g. FCC, ETSI or other).

The invention therefore provides a method that can avoid breaking FCC, ETSI or other legislations for the maximum allowed Tx power for low power transmitters in a reliable manner. It allows to maintain optimal output power and thus provide the user with the best FMTx experience, irrespective of what accessories have been connected or where the device is located, e.g. in the hand of the user or near some metal object which may influence the Tx antenna of the device. Thus any compatible accessory and/or charger can be used without the need for the accessory to have any intelligence of its own. Older compatible accessory/chargers can still be used. The invention will avoid FCC or ETSI requesting a recall of a device that may be tested to break the limits for radiated Tx power under certain conditions.

According to an exemplary embodiment adjusting the radiated power comprises stopping said radio transmission.

This enables to completely stop the transmission, for example if a connected accessory is detected that is disapproved by the manufacturer of the mobile device, e.g. because it has effects on the radiated power that cannot be compensated, like making the transmission unstable, or when the accessory causes an unknown increase in radiated power or an increase that cannot be compensated by a corresponding attenuation.

According to an exemplary embodiment said adjusting comprises that the transmission power is increased or decreased by a pre-determined amount, for example if an accessory device is connected for which the caused increase/decrease is already known.

According to an exemplary embodiment said detecting if an accessory device is connected comprises detecting a user input indicating that an accessory device is connected.

The invention also includes giving a user a manual way to indicate to the FMTx device that some kind of accessory or charger/power source has been connected to the device. This may take the form of a physical switch on the device or a software menu item/switch which is available through a software user interface UI.

According to an exemplary embodiment said detecting if an accessory device is connected is repeated in pre-determined intervals or performed continuously.

A substantially continuous detection will provide the best user experience. However, from other points of view like power consumption it may be better to perform the detection repeatedly in pre-determined intervals.

According to an exemplary embodiment detecting a change in transmission conditions comprises
 measuring the power radiated by said antenna at said mobile electronic device; and
 detecting if said measured radiated power exceeds a pre-determined upper limit.

According to an exemplary embodiment said adjusting comprises
 decreasing the transmission power if said measured radiated power exceeds said pre-determined upper limit.

According to an exemplary embodiment the method further comprises
 detecting if said measured radiated power falls below a pre-determined lower limit;
wherein said adjusting comprises
 increasing the transmission power if said measured radiated power falls below said pre-determined lower limit.

The benefit of this method for controlling the Tx output power is that the controlling software/hardware does not need to know anything about what is connected or where the device is placed in relation to other objects which may affect the characteristics of the transmit antenna. This method will always maintain the target output power, i.e. if the ERP increases the Tx device's output power can be reduced, if the ERP decreases, the Tx output power can be increased to compensate. It should be noted that "radiated power" refers to the radio power emitted by the antenna, while "transmission power" refers to the electrical power provided to the antenna through the radio circuit.

A closed loop system is employed such that the radiated power is either constantly being monitored and adjusted, or monitored and adjusted at set intervals. These intervals can be in the order of seconds. The benefit of using intervals is that it is likely to save power consumed by the device since this method will use less processor time.

According to an exemplary embodiment the method further comprises
 increasing the transmission power if the radiated power has not exceeded said upper limit for a pre-determined time span.

This will ensure that the maximum allowed power is used, while not requiring to measure if the radiated power falls below a desired lower limit. It may be difficult to exactly measure low radiated power compared to higher radiated power. Therefore in this embodiment an attempt will be made, e.g. every 10 seconds, to increase the transmission power (again).

According to an exemplary embodiment said measuring is repeated in pre-determined intervals or performed continuously.

According to an exemplary embodiment said upper and/or said lower pre-determined limit are selected based on at least one of
 positioning data;
 cellular network connection data;
 time-zone setting;
 language setting;
 country settings; and
 Mobile Country Code, MCC;
of said mobile electronic device.

The upper and/or lower limit will usually be given by some regional legislation. Therefore this embodiment allows determining the current regional position. The position can be determined directly from positional data, e.g. from a Global Positioning System receiver or like, through a cellular network connection in a cellular telecommunications system, from the used Mobile Country Code, or from certain language/country/time-zone settings made by a user.

According to an exemplary embodiment the method further comprises
 determining if the radiated power lies outside a power window; and
 generating an interrupt when the radiated power lies outside said window;
wherein said adjusting is performed responsive to said interrupt.

According to this alternative embodiment interrupts are used which will be triggered if a pre-set window which defines the operating radiated power limits is violated. This window can be established in a signal detector or a full-featured radio receiver or any other component allowing deriving at least a basic determination of the radiated power, depending on what is implemented in the respective device. The advantage of using this window and the interrupt-driven measurement is that the signal detector or receiver component does not need to be polled to provide the measurement. As polling uses more processing time and thus entails increased power consumption, it is advantageous if the signal detector or receiver component can indicate by itself if a violation of the window occurs. The violation of the window triggers the processing of the RSSI level that has caused the trigger event, and if it is confirmed in this processing that the ERP level is too high (or too low), the Tx power is adjusted accordingly.

In an alternative embodiment the first determination can be performed in a not very exact or "crude" manner, which may include performing less frequent signal level detection operations per time unit, while the more accurate measurement, which will usually use more processing cycles, can be performed only upon the interrupt, which may include performing more frequent signal level detection operations. The Tx power will then be adjusted only if the ERP is above a threshold for a given minimum time, e.g. 1 minute, otherwise it is returned to the less frequent signal level detection. As the more frequent detection will consume more time and/or electrical power in a device than the less frequent signal level detection, this embodiment can also help to save power and processing time.

Upon servicing the interrupt the controlling device can check if the ERP is too high or too low and adjust the actual transmit power accordingly, by checking a real received signal strength indicator RSSI, or generally speaking performing a more accurate measurement than the determination that has triggered the interrupt. This can help to better stabilize and/or filter the measured radiated power, e.g. to minimize "false positives". This method is advantageous for monitoring and adjusting since it is event based and will generally use least power and will be most efficient in reacting to changes in ERP as and when required, due to the fact that a simple initial determination of the radiated power can be made without actually performing a full-featured measurement thereof, and performing the full measurement only upon the interrupt.

According to a second aspect of the invention a computer program product is provided, comprising program code for carrying out the method described above when said program product is run on an electronic device. In an exemplary embodiment the program code is stored on a computer-readable medium.

According to a third aspect of the invention a mobile electronic device is provided, comprising
  a radio transmitter circuit;
  an antenna connected with said radio transmitter circuit; and
  a controller adapted for transmitting a radio transmission using said radio transmitter circuit, detecting a change in transmission conditions, and adjusting the power radiated by said antenna in response to a detected change.

According to an exemplary embodiment said controller is adapted for adjusting the matching between said antenna and said radio transmitter circuit.

According to an exemplary embodiment said controller is adapted for detecting a change in transmission conditions by measuring the voltage swing at said antenna.

According to an exemplary embodiment the device further comprises
  a varactor connected to said antenna;
wherein said controller is adapted for performing said adjusting of said radiated power by controlling said varactor.

According to an exemplary embodiment said controller is adapted for repeating said adjusting in pre-determined, random or pseudo-random intervals.

According to the invention this can also be implemented as a processor controlled solution. This may consist of the processor having the ability to change a matching circuit for the antenna, e.g. via the use of a varactor (a semiconductor diode that acts as a variable capacitor), and then request from the device what the voltage swing is. This would have to be done after setting the desired frequency and/or Tx power. For an Rx antenna this would be done purely on the frequency the receiver is tuned to. The bigger the voltage swing, the better the match. The processor software could then search for the most optimal point, e.g. by performing some kind of binary chop in order to home in on the best antenna match.

According to an exemplary embodiment said controller is adapted for performing an initial adjusting of the matching between said antenna and said radio circuit before transmitting a radio transmission.

According to an exemplary embodiment the device further comprises
  an interface for providing audio data to be transmitted in said radio transmission;
wherein said controller is adapted for detecting passages in said audio data that have a local volume minimum and for performing said adjusting when a corresponding passage is detected.

An example for such a device could be a dedicated FMTx device to be connected with an audio player device. The interface can be analog, e.g. an earphone plug, or some digital interface like a Sony/Philips Digital Interface SPDIF.

According to an exemplary embodiment the device further comprises
  a storage component adapted for storing audio data and comprising said interface.

In case the device is e.g. a multimedia player, it will contain the source for the audio data itself, in form of a storage component like an integrated hard disk, flash memory or like. In this case the interface is an internal interface providing the audio data.

According to an exemplary embodiment said controller is adapted for detecting a change in transmission conditions by detecting if an accessory device is connected to said mobile electronic device.

According to an exemplary embodiment said controller is adapted for stopping said radio transmission.

According to an exemplary embodiment said controller is adapted for decreasing the transmission power by a pre-determined amount.

According to an exemplary embodiment said device further comprises
  a user interface;
wherein said controller is adapted for detecting a user input indicating that an accessory device is connected.

The user interface may be a dedicated switch, or be part of a user interface comprising e.g. a display and keypad.

According to an exemplary embodiment said controller is adapted for repeating said detecting in pre-determined intervals or continuously.

According to an exemplary embodiment the device further comprises
  a signal detector adapted for measuring the power radiated by said antenna;
wherein said controller is adapted for detecting a change in transmission conditions by detecting if said radiated power exceeds a pre-determined upper limit.

According to an exemplary embodiment said controller is adapted for adjusting the power radiated by said antenna by decreasing the transmission power if said measured radiated power exceeds said pre-determined upper limit.

According to an exemplary embodiment said controller is adapted for detecting a change in transmission conditions by detecting if said radiated power falls below a pre-determined lower limit and adjusting the power radiated by said antenna by increasing the transmission power if said measured radiated power exceeds said pre-determined lower limit.

According to an exemplary embodiment said controller is adapted for increasing the transmission power if the radiated power has not exceeded said upper limit for a pre-determined time span.

According to an exemplary embodiment said controller is adapted for performing said detecting if said radiated power exceeds said pre-determined upper limit or falls below said pre-determined lower limit in pre-determined intervals or continuously.

According to an exemplary embodiment the device further comprises an interrupt generator adapted for generating an interrupt when the radiated power lies outside a pre-determined power window;

wherein said controller is adapted for performing said adjusting responsive to said interrupt.

The interrupt generator can be coupled to some kind of basic determination component for the radiated power. The determination component does allow at least a basic determination of the radiated power, i.e. if a pre-set window for the power is violated or not, but does not necessarily provide accurately processed values for the Tx power. Upon the generated interrupt a full measurement is performed, maybe including a more detailed signal processing, in order to derive more accurate values. Having the signal detector provide interrupts by itself can help to save power and processing time, since otherwise the detector would have to be polled by the controller in regular intervals to achieve the signal level detection, which usually uses up more processing cycles and thus power.

In an alternative embodiment this may also be accomplished by having the signal level detector component perform less frequent detection operations in order to detect a window violation. Upon the interrupt generated by a violation in this basic detection operation, more frequent signal level detection operations will be performed and/or a more detailed signal processing, in order to provide improved detection accuracy. If the window is then still found to be violated for a pre-set minimum time, e.g. 30 seconds, the controller will adjust the Tx power accordingly. Otherwise the device returns to the less frequent detection mode.

As the basic determination component or performing less frequent signal level detections with this component (e.g. if it is implemented within a full-featured receiver) does use less power and/or the basic determination does require less processing time, this interrupt-driven implementation can save power and/or processing time.

According to an exemplary embodiment said controller is adapted for selecting said upper and/or said lower pre-determined limit based on at least one of positioning data;
cellular network connection data;
time-zone setting;
language setting;
country settings; and
Mobile Country Code, MCC;

of said mobile electronic device.

This embodiment can employ components of said mobile electronic device like a positioning receiver or a cellular interface. Or the device can use settings made be a user like time-zone, language used, country, to determine in which area the device is operated. Based on this the device can select the appropriate upper and/or lower limit for the radiated power.

According to an exemplary embodiment said device is one of or a combination of:

a dedicated Frequency Modulation Transmitter, FMTx, device;
a mobile phone;
a Personal Digital Assistant, PDA; and
a media player.

According to a fourth aspect of the invention a method is provided, comprising receiving a radio transmission using a radio receiver circuit connected to a corresponding antenna of a mobile electronic device; and
repeatedly adjusting the matching between said antenna and said radio transmitter circuit.

For electronic devices having a radio receiver, particularly for electronic devices having internal and thus usually small-sized antennas, the invention provides a method to keep the reception performance at the optimal level, by ensuring that the electronic matching between radio circuit and antenna is as good as possible.

According to an exemplary embodiment the method further comprises measuring the voltage swing at said antenna;
wherein said adjusting is performed such that the voltage swing is maximized.

According to an exemplary embodiment said adjusting is repeated in pre-determined, random or pseudo-random intervals.

According to a fifth aspect of the invention a mobile electronic device is provided, comprising a radio receiver circuit;
an antenna connected to said radio receiver circuit; and
a controller adapted for receiving a radio transmission using said radio receiver circuit and repeatedly adjusting the matching between said antenna and said radio transmitter circuit.

According to an exemplary embodiment said controller is adapted for measuring the voltage swing at said antenna and performing said adjusting such that the voltage swing is maximized.

According to an exemplary embodiment said controller is adapted for repeating said adjusting in pre-determined, random or pseudo-random intervals.

BRIEF DESCRIPTION OF THE DRAWINGS

The invention can be more fully understood by the following detailed description of exemplary embodiments, when also referring to the drawings, which are provided in an exemplary manner only and are not intended to limit the invention to any particular embodiment illustrated therein. In the drawings

Figure 1:
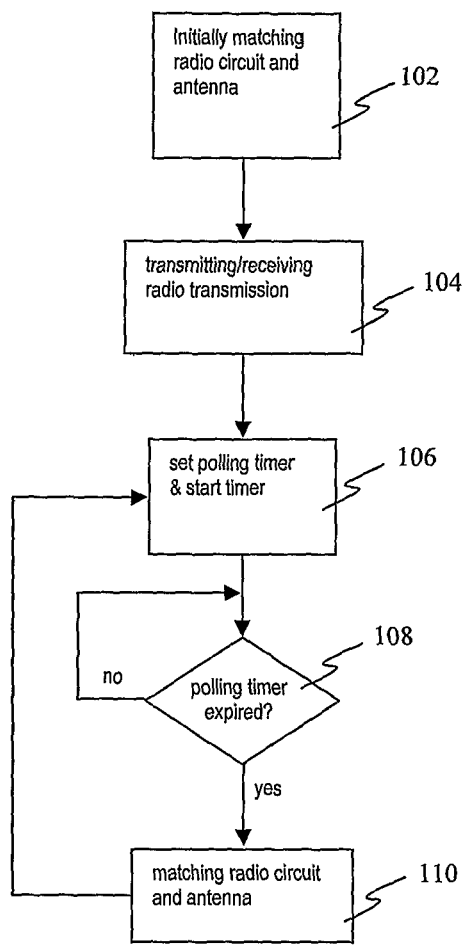
FIG. 1 is a flow diagram of an embodiment of the inventive method.

It is to be noted that elements from different embodiments are not limited to be used only in the particular embodiment in conjunction of which they are described, but may also be combined with elements from other embodiments.

DETAILED DESCRIPTION OF THE INVENTION

It is to be noted that the matching between antenna and radio circuit according to the invention can be applied to both transmission (Tx) and reception (Rx), although the following detailed description will mainly focus on the Tx case. The matching of the invention can be applied to Rx in the same manner as it is done for Tx with respect to how the presence of external objects and/or connected accessory devices can influence the performance of the Rx antenna. The objective for both is to ensure that the antenna (Tx or Rx) remains as optimally matched to the associated RF output stage as is possible at all times while complying with any limits given by legislative regulations.

The prior art provides devices allowing the user to manually select the region in which the device will be operated. The Tx power level, i.e. power radiated by the antenna, is then set appropriately according to the user's choice. This power level should be set according to a country's legislation, e.g. according to FCC for the US and ETSI for Europe and Japan. Any external influences to the device's Tx antenna could mean that the device will break whichever legislation/region has been set. Also this cannot prevent the user from deliberately using a setting allowing a higher output power than allowed, e.g. by choosing the ETSI setting for operation in the USA, or from using certain accessories known to increase the radiated power, like some headsets.

The invention prevents any low power FM transmitter device from radiating too much power irrespective of how the device is powered (either internally or externally) or what cables/accessories have been attached. It also helps maintain the correct radiated power irrespective of the device's location, e.g. if the device is held in the hand or placed near an object which may alter the transmitted power level. If an object influences the antenna of the device in such a way as to change the radiated power, the transmission power level can be compensated to take this into account. The invention is therefore ideal for maintaining a target power level irrespective of how an accessory or placement influences the radiating antenna.

The invention also suggests to periodically re-match the output stage and the antenna of an FM transmitter such that irrespective of the FMTx device's location (held in the hand or close to/on top of a metal object), the device's antenna will always maintain optimal efficiency.

A typical use case is when a user has to hold the device in the palm of his hand in order to set-up the FMTx device for use, e.g. setting up the frequency to transmit on and the audio content to listen to. The user then places the device in another location e.g. on the car seat, in a holder/cradle or perhaps in the glove-box or a recess somewhere in the vehicle. At this point the antenna would easily become mismatched since at the point of starting the transmitter, the antenna would have been matched at the point where the device was being held. Removal of the hand from around the device would mean that the effects of the hand on the antenna are no longer there and the antenna's characteristics would change.

Ideally, a system in which the antenna is continually being (re-)matched would be the best solution, but this may be impractical from a technical point of view. Instead, it is more conceivable to rematch about every 5 or 10 seconds. The more often the re-matching is performed the more power is likely to be consumed in the device and it is likely that the user may experience more brief (albeit very short) interruptions in the transmitted audio. This of course depends on how the re-matching process is implemented.

In FIG. 1 a flow diagram of an embodiment of the inventive method is illustrated. In step 102 an initial matching between antenna and associated radio circuit is performed. This step is optional. In step 104 a radio transmission is transmitted or received. In step 106 a polling timer is set, e.g. to a time interval of 10 seconds, and is started. In step 108 it is checked if the polling timer has expired. If yes, another matching is performed in step 110 and the process returns to step 106, in order to repeat the re-matching continuously.

Figure 2:
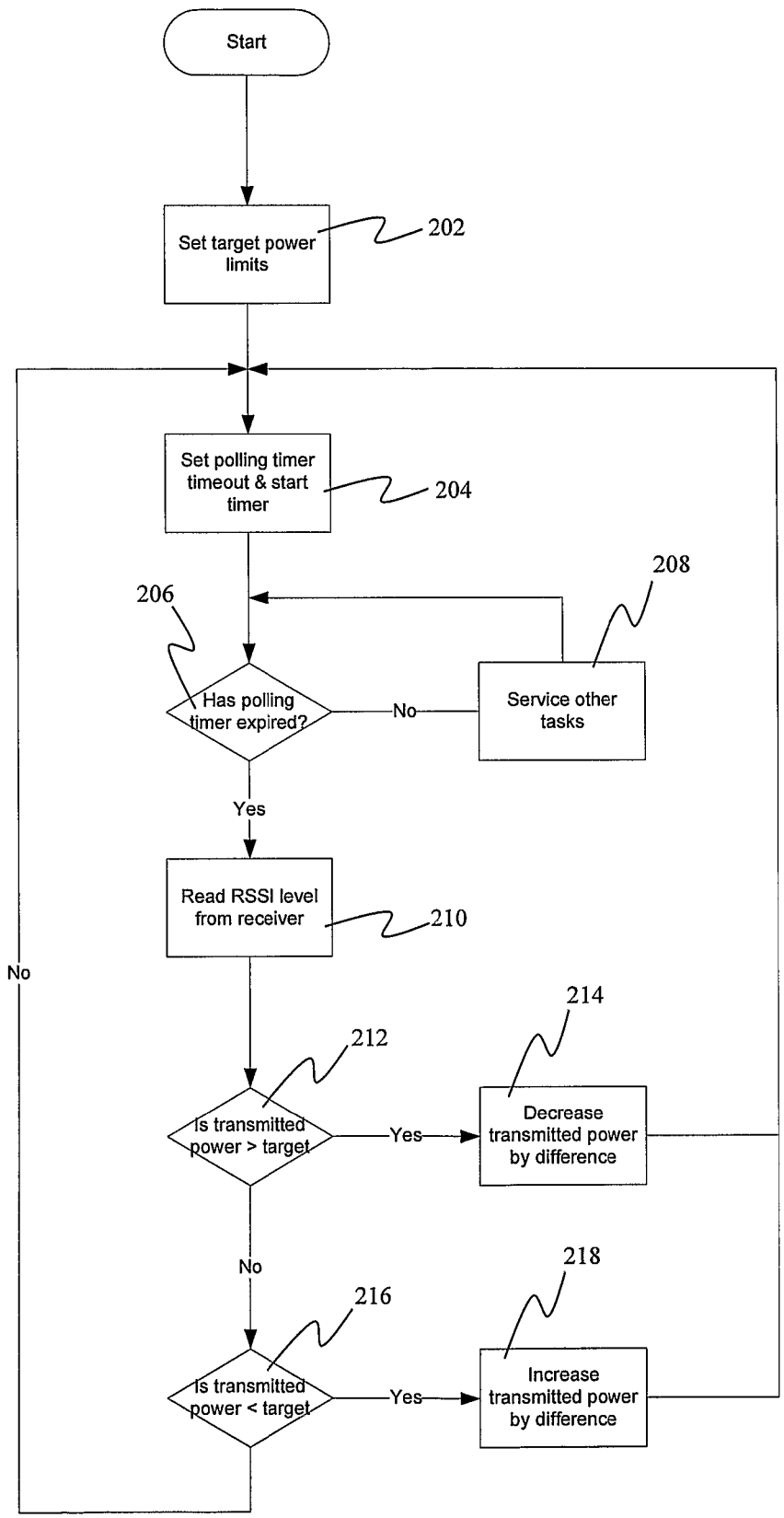
FIG. 2 is a flow diagram of another embodiment of the inventive method.

FIG. 2 illustrates a flow diagram of another embodiment of the present invention. In step 202 at least an upper target power limit is set, optionally also a lower power limit. In step 204 a polling timer is set, e.g. to a time interval of 10 seconds, and is started. In step 206 it is checked if the polling timer has expired, and as long it has not expired, other tasks can be serviced in step 208. If it has expired, a Received Signal Strength Indicator (RSSI) value is read from the receiver in step 210, i.e. the transmission power or radiated power is measured. In step 212 it is checked if the transmitted power is higher than the set target limit. If this is the case, the transmission power is decreased in step 214, preferably by an amount equal to the difference to the target limit. The process returns to step 204 then. If the transmitted power is lower than the set lower target limit in step 216, the transmission power is increased in step 218, preferably by an amount equal to the difference to the target limit. Then, or also when the transmitted power is not below the target limit, the process returns to step 204.

Figure 3:
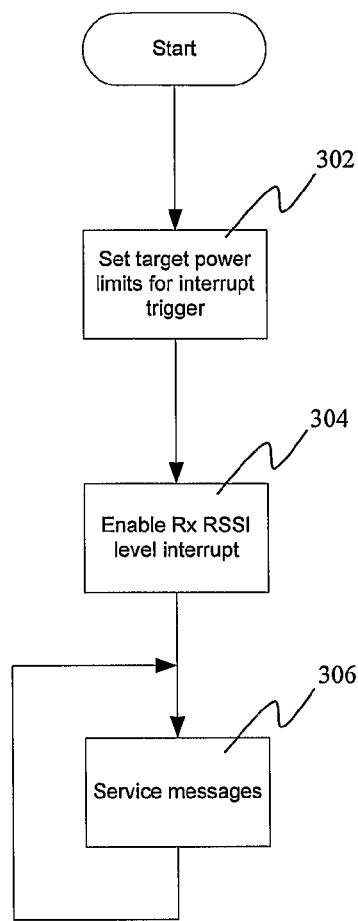
FIGS. 3 and 4 are flow diagrams of an alternative embodiment of the inventive method.
Figure 4:
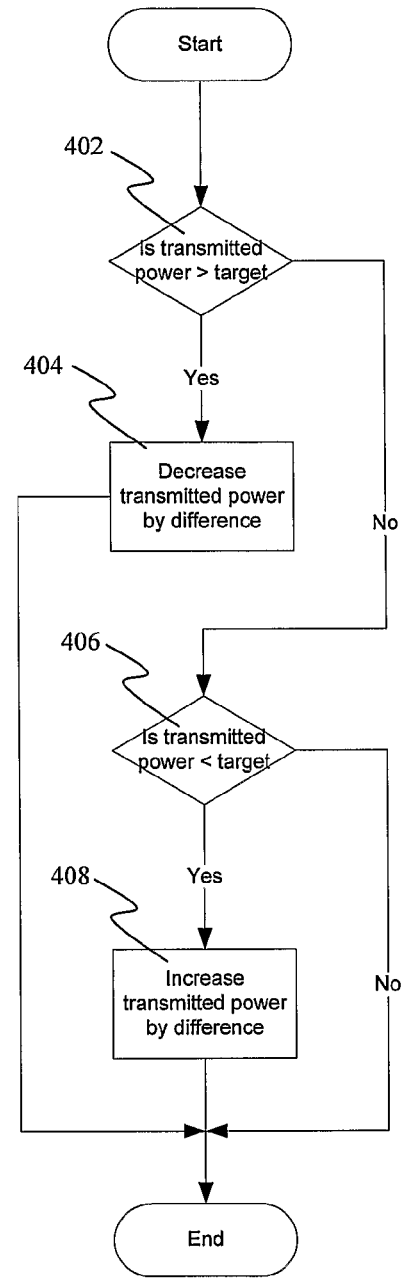

FIGS. 3 and 4 illustrate an alternative embodiment using an interrupt- or event-based detection. In FIG. 3, in step 302 the target power limits are set, i.e. a target window is defined for the radiated power. In step 304 an interrupt for the Rx RSSI level is activated, i.e. when the RSSI value lies outside the defined target window an interrupt is generated. In step 306 the system performs normal other tasks, i.e. other events/messages are being served. The process then continues with the steps of FIG. 4.

In FIG. 4, in step 402 it is checked if the radiated power is higher than the set target limit. If yes, the transmission power is decreased in step 404 and the process is ended and started again when the next interrupt is received. If not, it is checked if the radiated power is lower than the lower target limit, in step 406. If yes, the transmission power is increased in step 408. In case of "no" in step 406, the process is ended, also after step 408. Preferably the decreasing and increasing are performed by an amount equal to the difference to the respective target limit.

In the following exemplary alternatives for achieving an object of the invention are described:

1) A mobile FMTx device could cease to operate when an accessory is detected. Detection may be achieved by communicating with an intelligent device and hence by obtaining some kind of device ID or by some electro-mechanical switch which physically detects that something has been plugged in. A typical use case is to use an FMTx device in the car while traveling and normally a user would want to power the device via the car DC adaptor. Stopping the FMTx altogether renders the device useless in this use case. This may be desirable in order to cease operation in case an accessory device is connected that is disapproved by the manufacturer of the mobile device, e.g. because it is known to make the transmission unstable in a way that cannot be compensated, like requiring an attenuation that would be higher than the device can provide.

2) The FMTx device could reduce the transmission power by as much as 30 dB upon detection of an accessory. This detection could be performed in the same manner as described in 1).

3) A user could be presented with some manual way to indicate to the FMTx device that some kind of accessory or charger/power source has been connected to the device. This may be implemented in form of a physical switch on the device or a software menu item/switch which is available through a user interface UI.

4) An on-board FM discrete receiver or a combi (Tx/Rx) package could be used to detect what the radiated power level is at any time. In the case of the combined Tx/Rx package, the device would have to allow separate control of the Tx and Rx devices, i.e. the devices can not be mutually exclusive as some combi packages currently available share key control and RF blocks in the Application Specific Integrated Circuit (ASIC). This would also require separate antennas, as a combine/shared antenna would mean that the Rx device would be directly measuring the transmission power provided to the antenna as opposed to radiated power. The FM receiver could either be polled or driven via interrupts using programmable threshold levels to determine if the power level has fallen outside of defined limits.

This approach would mean that the FM receiver ideally would need an internal antenna with enough isolation between the FM Rx and FM Tx antennas to ensure that radiated power is measured as opposed to leakage or cross talk. The benefit of this method for controlling the Tx output power is that the controlling software/hardware does not need to know anything about what is connected or where the device is in relation to other objects which may affect the characteristics of the transmit antenna. This method will always maintain the target output power, i.e. if the ERP increases the Tx device's output power can be reduced, and if the ERP decreases below optimal level, the Tx output power can be increased to compensate.

A closed loop system is employed such that the Tx power is either constantly being monitored and adjusted, or monitored and adjusted at set intervals. These intervals could be in the order of seconds. The benefit of using intervals is that it is likely to save power consumed by the device since this method will use less processor time. Another alternative is to use interrupts which will be triggered if a pre-set window which defines the operating Tx power limits is violated. Upon servicing the interrupt the controlling device can check if the ERP is too high or too low and adjust the actual transmit power accordingly. This method is an advantageous method of monitoring and adjusting since it is event based and will generally use least power and will be most efficient in reacting to changes in ERP as and when required.

The advantages of the invention are that it can help avoid breaking FCC, ETSI or other legislations for the maximum allowed Tx power for low power transmitters. It will always maintain optimal output power and thus present the user with the best FMTx experience irrespective of what accessories have been connected or where the device is, e.g. in the hand of the user or near some metal object which may influence the device's Tx antenna. Any compatible accessory and/or charger can be used without the need for the accessory to have any intelligence of its own. Older compatible accessory/chargers can still be used. The invention can help avoiding FCC or ETSI requesting a recall on a device that may break the limits for radiated Tx power under certain conditions.

Figure 5:
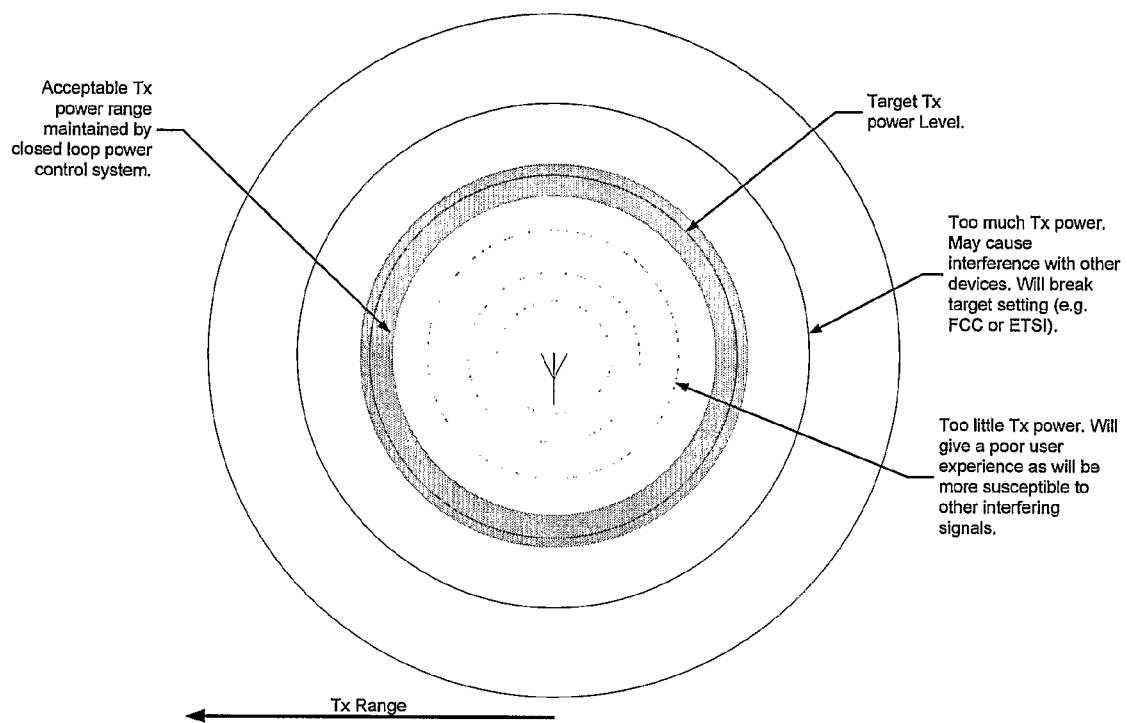
FIG. 5 illustrates how the range of a transmitter device can be affected.

FIG. 5 shows how the range of the transmitter can be affected by an external object or an accessory. Generally, adding an accessory or placing the device near a cable/wire will usually improve the ERP and hence the range of the FMTx device. Any radiated power exceeding the targeted upper power limit means breaking FCC, ETSI or other legislation. It may also mean that the antenna performance could be degraded further by dematching/mismatching caused by external objects influencing the Tx antenna. In this case the ERP will be reduced and hence the range will be reduced. This will make the FMTx feature appear unreliable to a user as he is likely to experience fading in/out of the transmission and also breakthroughs and interference from other more powerful signals.

The area encompassing the target Tx power level is the acceptable Tx power range. The invention will try to maintain a level within this region. It may be that the actual Tx power exceeds the target by a small amount but this can be adjusted to suit the application as required. In most cases the FCC and ETSI legislation will be tolerant of small increases due to the difficulty in accurately measuring radiated power. The important point is that the target power is maintained within acceptable limits to avoid breaking any legislation and also to keep the power as close to this as possible to ensure good user experience of FMTx.

Figure 6:
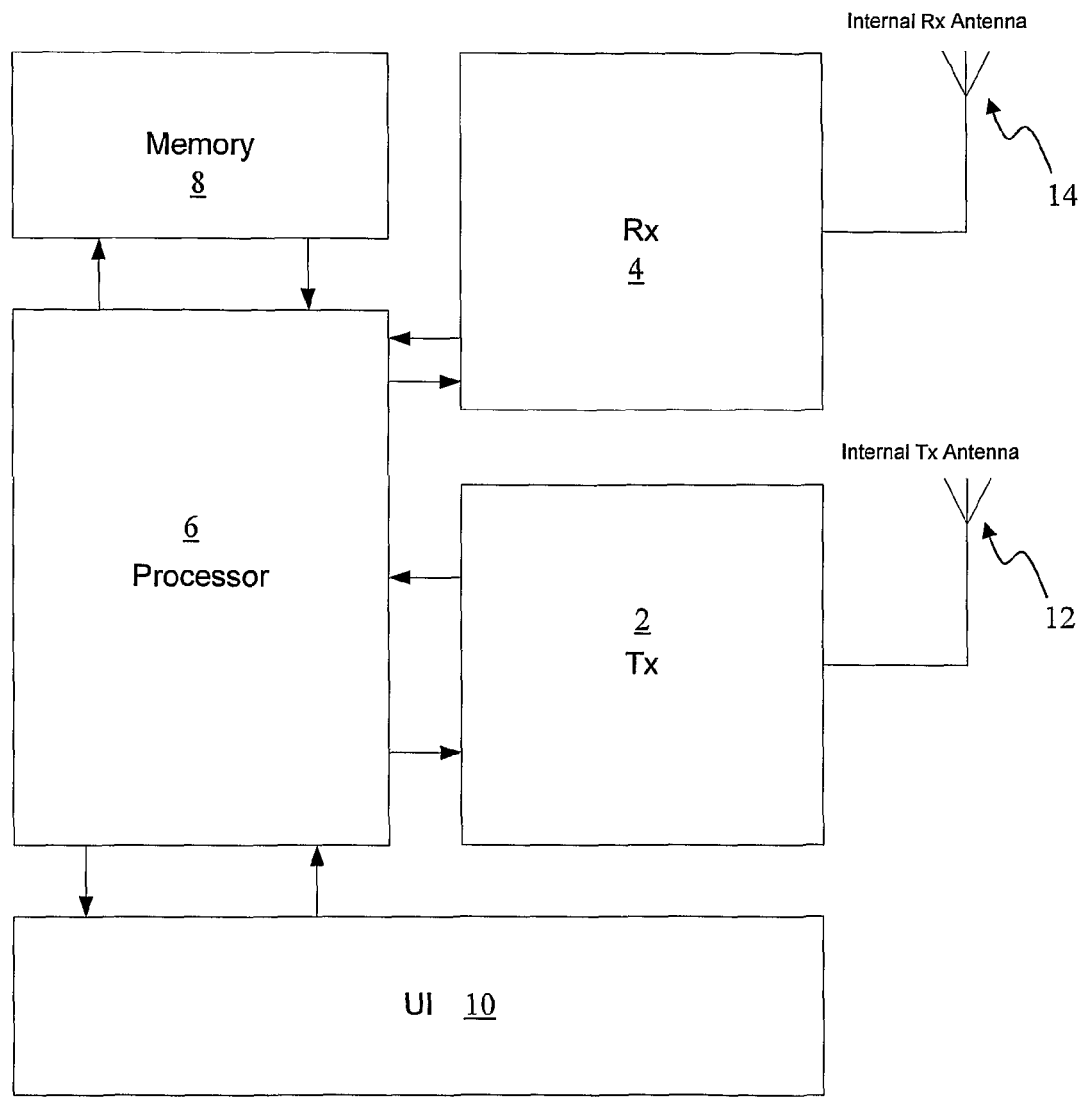
FIG. 6 is a schematic block diagram of components of a device according to an embodiment of the invention.

FIG. 6 is a schematic view of components of a mobile FMTx device according to an embodiment of the invention. It comprises a radio transmitter circuit Tx, 2, connected with an associated antenna 12 that can be an internal antenna. Similarly it comprises a radio signal detector circuit Rx, 4, connected with an associated antenna 14 that can be an internal antenna. The Tx and Rx circuits 2 and 4 are connected with a central processor 6 controlling the device. The processor 6 is in turn connected with a memory 8 for storing audio or other data to be transmitted via radio transmission. A user interface UI, 10 is provided, e.g. for receiving user input, displaying currently played music track etc. The discrete Tx and Rx circuits 2, 4 shown here can also be combined in a single package. However, they would still be required to be independent of each other and not mutually exclusive as in some devices available today.

The processor 6 is adapted for measuring the power radiated by the Tx antenna 12 during a radio transmission, e.g. an audio track to a car stereo receiver, using the Rx circuit 4 with its antenna 14. In case the measured power exceeds the set limit (e.g. power levels prescribed by FCC, ETSI) the processor 6 can adjust the transmission power by correspondingly controlling the Tx circuit 2. This also applies to cases where the radiated power is below the level that would legally be allowed. In such cases the processor 6 can also adjust the transmission power accordingly, in order to exploit the legal limit as best as possible, to provide the best transmission performance.

The invention achieves that in a mobile FMTx (or Rx) device the antenna is continuously operated with the optimal matching. Also an FMTx device will continuously be operated using the optimal radiated power while also complying with the corresponding legal restrictions.

The invention claimed is:

1. A method, comprising:
    determining to transmit a radio broadcast transmission that carries audio data, using a radio transmitter circuit connected to a corresponding antenna of a mobile electronic device;
    detecting a change in transmission conditions;
    determining to adjust impedance matching between said antenna and said radio transmitter circuit, in response to the detecting a change in transmission conditions, to be in compliance with broadcast power level legislative regulations at a current regional position of the mobile electronic device;
    detecting an occurrence of one or more passages in said audio data, which have local volume minimums, in said radio broadcast transmission;
    placing operations for the adjustment of the impedance matching so that they occur during said local volume minimums of said passages, in response to said detecting said local volume minimums of said passages in said audio data carried in the radio transmission; and adjusting, during said occurrence of said one or more passages in said audio data, which have local volume minimums in said radio broadcast transmission, impedance matching between said antenna and said radio transmitter circuit to be in compliance with said broadcast power level legislative regulations at the current regional position of the mobile electronic device, in response to said detecting said local volume minimums of said passages in said audio data carried in the radio transmission, whereby interruption or distortion of the audio transmission caused by said adjusting, is less likely noticed.

2. The method according to claim 1, further comprising measuring a voltage swing at said antenna.

3. The method according to claim 1, further comprising:
determining a broadcast power radiated by said antenna to be noncompliant with one or more broadcast power level legislative regulations; and
adjusting the broadcast power radiated by said antenna to be in compliance with said broadcast power level legislative regulations.

4. The method according to claim 3, wherein said broadcast power adjusting is repeated in pre-determined, random or pseudo-random intervals.

5. The method according to claim 1, further comprising at least one of:
measuring the power radiated by said antenna at said mobile electronic device;
detecting if said measured radiated power exceeds a pre-determined upper limit;
decreasing the transmission power if said measured radiated power exceeds said pre-determined upper limit;
detecting if said measured radiated power falls below a pre-determined lower limit;
increasing the transmission power if said measured radiated power falls below said pre-determined lower limit; and
increasing the transmission power if the radiated power has not exceeded said upper limit for a pre-determined time span.

6. The method according to claim 5, wherein said upper and/or said lower pre-determined limit are selected based on at least one of:
positioning data;
cellular network connection data;
time-zone setting;
language setting;
country settings; and
Mobile Country Code, MCC; of said mobile electronic device.

7. An apparatus, comprising:
a radio transmitter circuit;
an antenna connected to said radio transmitter circuit; and
a controller configured to determine to transmit a radio broadcast transmission that carries audio data, using said radio transmitter circuit, configured to detect a change in transmission conditions, configured to determine to adjust impedance matching between said antenna and said radio transmitter circuit, in response to the detecting a change in transmission conditions, to be in compliance with broadcast power level legislative regulations at a current regional position of the apparatus, configured to detect an occurrence of one or more passages in said audio data, which have local volume minimums, in said radio broadcast transmission, configured to place operations for the adjustment of the impedance matching so that they occur during said local volume minimums of said passages, in response to said detecting said local volume minimums of said passages in said audio data carried in the radio transmission, and configured to adjust, during said occurrence of said one or more passages in said audio data, which have local volume minimums in said radio broadcast transmission, impedance matching between said antenna and said radio transmitter circuit to be in compliance with said broadcast power level legislative regulations at the current regional position of the apparatus, in response to said detecting said local volume minimums of said passages in said audio data carried in the radio transmission, whereby interruption or distortion of the audio transmission caused by said adjusting, is less likely noticed.

8. The apparatus according to claim 7, wherein said controller is configured to determine a broadcast power radiated by said antenna to be noncompliant with one or more broadcast power level legislative regulations, and configured to adjust the broadcast power radiated by said antenna to be in compliance with said broadcast power level legislative regulations.

9. The apparatus according to claim 8, wherein said controller is configured to detect if said radiated power exceeds a pre-determined upper limit or falls below a pre-determined lower limit in pre-determined intervals or continuously.

10. The apparatus according to claim 7, wherein said controller is configured to measure the voltage swing at said antenna.

11. The apparatus according to claim 7, wherein said controller is configured to detect if an accessory device is connected to said mobile electronic device.

12. The apparatus according to claim 7, further comprising:
a signal detector configured to measure the power radiated by said antenna;
wherein said controller is configured to detect if said radiated power exceeds a pre-determined upper limit.

13. The apparatus according to claim 12, wherein said controller is configured to adjust the power radiated by said antenna by decreasing the transmission power if said measured radiated power exceeds said pre-determined upper limit.

14. The apparatus according to claim 7, wherein said controller is configured to detect if said radiated power falls below a pre-determined lower limit and configured to adjust the power radiated by said antenna by increasing the transmission power if said measured radiated power falls below said pre-determined lower limit.

15. The apparatus according to claim 7, wherein said controller is configured to increase the transmission power if the radiated power has not exceeded an upper limit for a pre-determined time span.

16. The apparatus according to claim 7, wherein said controller is configured to select a pre-determined upper limit and/or a pre-determined lower limit based on at least one of:
positioning data;
cellular network connection data;
time-zone setting;
language setting;
country settings; and
Mobile Country Code, MCC; of said apparatus.

17. A method, comprising:
receiving a radio transmission that carries audio data, using a radio receiver circuit connected to a corresponding antenna of a mobile electronic device;
detecting a change in transmission conditions;

determining to adjust impedance matching between said antenna and said radio receiver circuit, in response to the detecting a change in transmission conditions, to be in compliance with broadcast power level legislative regulations at a current regional position of the mobile electronic device;

detecting an occurrence of one or more passages in said audio data, which have local volume minimums, in said radio transmission;

placing operations for the adjustment of the impedance matching so that they occur during said local volume minimums of said passages, in response to said detecting said local volume minimums of said passages in said audio data carried in the radio transmission; and adjusting, during said occurrence of said one or more passages in said audio data, which have local volume minimums in said radio broadcast transmission, impedance matching between said antenna and said radio receiver circuit to be in compliance with said broadcast power level legislative regulations at the current regional position of the mobile electronic device, in response to said detecting said local volume minimums of said passages in said audio data carried in the radio transmission, whereby interruption or distortion of the audio reception caused by said adjusting, is less likely noticed.

18. The method according to claim 17, further comprising:
measuring a voltage swing at said antenna;
wherein said adjusting is performed such that the voltage swing is maximized.

19. An apparatus, comprising:
a radio receiver circuit;
an antenna connected to said radio receiver circuit; and
a controller configured to receive a radio transmission that carries audio data, using said radio receiver circuit, configured to detect a change in transmission conditions, configured to determine to adjust impedance matching between said antenna and said radio receiver circuit, in response to the detecting a change in transmission conditions, to be in compliance with broadcast power level legislative regulations at a current regional position of the apparatus, configured to detect an occurrence of one or more passages in said audio data, which have local volume minimums, in said radio transmission, configured to place operations for the adjustment of the impedance matching so that they occur during said local volume minimums of said passages, in response to said detecting said local volume minimums of said passages in said audio data carried in the radio transmission, and configured to adjust, during said occurrence of said one or more passages in said audio data, which have local volume minimums in said radio transmission, impedance matching between said antenna and said radio receiver circuit to be in compliance with said broadcast power level legislative regulations at the current regional position of the apparatus, in response to said detecting said local volume minimums of said passages in said audio data carried in the radio transmission, whereby interruption or distortion of the audio reception caused by said adjusting, is less likely noticed.

20. The apparatus according to claim 19, wherein said controller is configured to measure a voltage swing at said antenna and configured to perform said adjusting such that the voltage swing is maximized.

* * * * *